(12) United States Patent
Kato

(10) Patent No.: US 7,336,824 B2
(45) Date of Patent: Feb. 26, 2008

(54) IMAGE PROCESSING APPARATUS AND IMAGE PROCESSING METHOD

(75) Inventor: Yumi Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 10/984,671

(22) Filed: Nov. 8, 2004

(65) Prior Publication Data

US 2005/0157924 A1 Jul. 21, 2005

(30) Foreign Application Priority Data

Nov. 10, 2003 (JP) .......................... P2003-380165

(51) Int. Cl.
*G06K 9/00* (2006.01)
(52) U.S. Cl. ...................... 382/170; 382/194; 382/305
(58) Field of Classification Search ................ 382/168, 382/170, 115, 190, 192, 194, 195, 305, 306
See application file for complete search history.

(56) References Cited

U.S. PATENT DOCUMENTS 5,625,704 A * 4/1997 Prasad ........................ 382/118
6,975,348 B2 * 12/2005 Chiu et al. .................. 348/169

* cited by examiner

*Primary Examiner*—Phuoc Tran
(74) *Attorney, Agent, or Firm*—Bell, Boyd & Lloyd LLP

(57) ABSTRACT

An image processing apparatus and an image processing method are provided. The image processing apparatus can shorten the verification time when using a plurality of verification use image data stored in a memory for verification, identifically a verification apparatus which generates histogram data by a histogram data generation unit based on image captured data of a person being checked, specifies a peak value of the number of the pixel data in the histogram data by a verification unit, and reads out verification use image data stored in the memory linked with the peak value closest to the specified peak value for the verification, and a method of the same. Verification use image data stored in the memory is stored based on the peak values.

8 Claims, 9 Drawing Sheets

FIG. 3

| REGISTERED PERSON | FILE NAME VER_FN | PEAK VALUE P | ADDRESS ADR |
|---|---|---|---|
| REGISTERED PERSON PSN4 | VER_FN4 | P4 (1300) | ADR4 |
| REGISTERED PERSON PSN1 | VER_FN1 | P1 (1404) | ADR1 |
| REGISTERED PERSON PSN3 | VER_FN3 | P3 (1456) | ADR3 |
| REGISTERED PERSON PSN2 | VER_FN2 | P2 (1550) | ADR2 |
| REGISTERED PERSON PSN5 | VER_FN5 | P5 (1565) | ADR5 |
| REGISTERED PERSON PSN6 | VER_FN6 | P6 (1601) | ADR6 |

RTB

FIG. 5

| REGISTERED PERSON | FILE NAME VER_FN | PEAK VALUE P | ADDRESS ADR |
|---|---|---|---|
| REGISTERED PERSON PSN4 | VER_FN4 | P4 (1300) | ADR4 |
| REGISTERED PERSON PSN1 | VER_FN1 | P1 (1404) | ADR1 |
| REGISTERED PERSON PSN3 | VER_FN3 | P3 (1456) | ADR3 |
| REGISTERED PERSON PSN2 | VER_FN2 | P2 (1550) | ADR2 |
| REGISTERED PERSON PSN5 | VER_FN5 | P5 (1565) | ADR5 |
| REGISTERED PERSON PSN6 | VER_FN6 | P6 (1601) | ADR6 |
| REGISTERED PERSON PSN7 | VER_FN7 | P6 (1500) | ADR7 |

RTB

FIG. 6

| | FILE NAME VER_FN | PEAK VALUE P | ADDRESS ADR |
|---|---|---|---|
| REGISTERED PERSON PSN4 | VER_FN4 | P4 (1300) | ADR4 |
| REGISTERED PERSON PSN1 | VER_FN1 | P1 (1404) | ADR1 |
| REGISTERED PERSON PSN3 | VER_FN3 | P3 (1456) | ADR3 |
| REGISTERED PERSON PSN7 | VER_FN7 | P6 (1500) | ADR7 |
| REGISTERED PERSON PSN2 | VER_FN2 | P2 (1550) | ADR2 |
| REGISTERED PERSON PSN5 | VER_FN5 | P5 (1565) | ADR5 |
| REGISTERED PERSON PSN6 | VER_FN6 | P6 (1601) | ADR6 |

RTB

FIG. 8

| | FILE NAME VER_FN | PEAK VALUE P | ADDRESS ADR |
|---|---|---|---|
| REGISTERED PERSON PSN4 | VER_FN4 | P4 (=1300) | ADR4 |
| REGISTERED PERSON PSN1 | VER_FN1 | P1 (=1404) | ADR1 |
| REGISTERED PERSON PSN3 | VER_FN3 | P3 (=1456) | ADR3 |
| REGISTERED PERSON PSN7 | VER_FN7 | P6 (=1500) | ADR7 |
| REGISTERED PERSON PSN2 | VER_FN2 | P2 (=1550) | ADR2 |
| REGISTERED PERSON PSN5 | VER_FN5 | P5 (=1565) | ADR5 |
| REGISTERED PERSON PSN6 | VER_FN6 | P6 (=1601) | ADR6 |

RTB (6) → PSN4
(4) → PSN1
(2) → PSN3
(1) IDENTIFY IN THE ST13 → PSN7
(3) → PSN2
(5) → PSN5
(7) → PSN6

IMAGE PROCESSING APPARATUS AND IMAGE PROCESSING METHOD

CROSS REFERENCE TO RELATED APPLICATIONS

This application claims priority to Japanese Patent Document No. P2003-380165 filed on Nov. 10, 2003, the disclosure in its entirety of which is herein incorporated by reference.

BACKGROUND OF THE INVENTION

The present invention relates to an image processing apparatus for processing, for example, image data obtained by capturing an image of a checked object and to a method of same.

In general, there is known a verification apparatus using image data obtained by biometric scanning so as to verify (authenticate) an individual. The verification apparatus provides, for example, that each of a number of persons to be registered has his or her finger scanned for his or her fingerprint to generate image captured data. This image captured data is skeletonized to generate verification use image data. The verification apparatus stores the plurality of verification use image data for the plurality of persons to be registered in its memory. At the time of verification, it reads out the plurality of verification use image data from the memory for example in the order of registration and compares the same with the image data under examination for verification.

The verification apparatus as previously discussed, however, reads out the plurality of verification use image data stored in the memory for verification in the order of registration, so if the verification use image data of the person being checked was registered relatively late, this can require a very long time for the verification.

SUMMARY OF THE INVENTION

The present invention relates to an image processing apparatus for processing, for example, image data obtained by capturing an image of a checked object and to a method of same.

The present invention in an embodiment provides an image processing apparatus able to shorten the verification time when using a plurality of verification use image data stored in a storing means for verification and to a method of the same.

According to an embodiment, there is provided an image processing apparatus including a histogram data generating means for generating histogram data indicating the number of pixel data indicating a particular pixel value for each pixel value based on image captured data comprised of a plurality of pixel data obtained by capturing an image of an object to be registered and each indicating a pixel value; a peak specifying means for specifying a peak value of the number of the pixel data indicating a particular pixel value for pixel values in a predetermined range in the histogram data generated by the histogram data generating means; a storing means for storing the verification use image data obtained based on the image captured data; and a processing means for writing the verification use image data into the storing means linked with the peak value specified by the peak specifying means corresponding to that verification use image data and sorting the peak values linked with the verification use image data stored in the storing means.

The mode of operation of the image processing apparatus of an embodiment is provided as follows. First, the histogram data generating means generates histogram data indicating the number of pixel data indicating a particular pixel value for each pixel value based on image captured data that includes a plurality of pixel data obtained by capturing an image of an object to be registered and each indicating a pixel value. Next, the peak specifying means specifies a peak value of the number of pixel data indicating a particular pixel value for pixel values within a predetermined range in the histogram data generated by the histogram data generating means. Next, the processing means writes the verification use image data into a storing means linked with the peak value specified by the peak specifying means corresponding to the verification use image data and sorts the peak values linked with the verification use image data stored in the storing means.

According to another embodiment, there is provided an image processing method comprising a first step of generating histogram data indicating the number of pixel data indicating a particular pixel value for each pixel value based on image captured data comprised of a plurality of pixel data obtained by capturing an image of an object to be registered and each indicating a pixel value; a second step of specifying a peak value of the number of the pixel data indicating a particular pixel value for pixel values in a predetermined range in the histogram data generated at the first step; a third step of generating verification use image data based on the image captured data; and a fourth step of writing the verification use image data generated at the third step into the storing means linked with the peak value specified at the second step corresponding to the verification use image data and sorting the peak values linked with the verification use image data stored in the storing means.

The mode of operation of the image processing method of an embodiment is described as follows. First, the first step generates histogram data indicating the number of pixel data indicating a particular pixel value for each pixel value based on image captured data comprised of a plurality of pixel data obtained by capturing an image of an object to be registered and each indicating a pixel value. Next, the second step specifies a peak value of the number of pixel data indicating a particular pixel value for pixel values within a predetermined range in the histogram data generated at the first step. The third step generates verification use image data based on the image captured data. Next, the fourth step writes the verification use image data generated at the third step into a storing means linked with the peak value specified at the second step corresponding to that verification use image data and sorts the peak values linked with the verification use image data stored in the storing means.

Additional features and advantages of the present invention are described in, and will be apparent from, the following Detailed Description of the Invention and the figures.

BRIEF DESCRIPTION OF THE FIGURES

FIG. 3 is a view for explaining reference table data shown in FIG. 1.

FIG. 5 is a view for explaining updating of the reference table data by the verification unit shown in FIG. 1.

FIG. 6 is a view for explaining updating of the reference table data by the verification unit shown in FIG. 1.

FIG. 8 is a view for explaining the mode of use of the reference table data by the verification unit shown in FIG. 1.

DETAILED DESCRIPTION OF THE INVENTION

The present invention relates to an image processing apparatus for processing, for example, image data obtained by capturing an image of a checked object and to a method of same.

Preferred embodiments of the present invention will be described in detail below while referring to the attached figures.

First, an explanation will be given of the correspondence between the configuration of the claims of the present application and the configuration of the embodiments.

Figure 1:
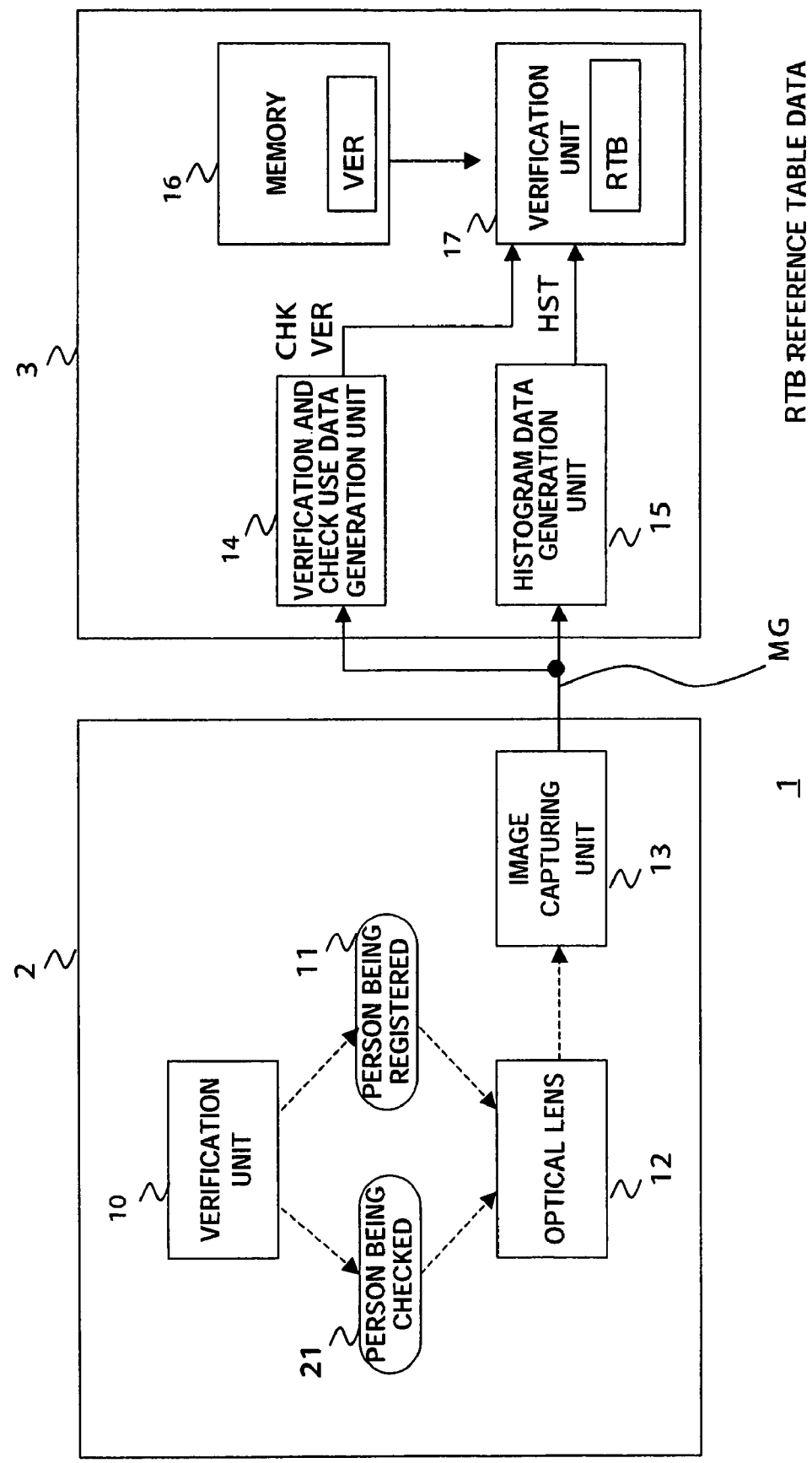
FIG. 1 is a view of the configuration of a verification system according to an embodiment of the present invention.
Figure 9:
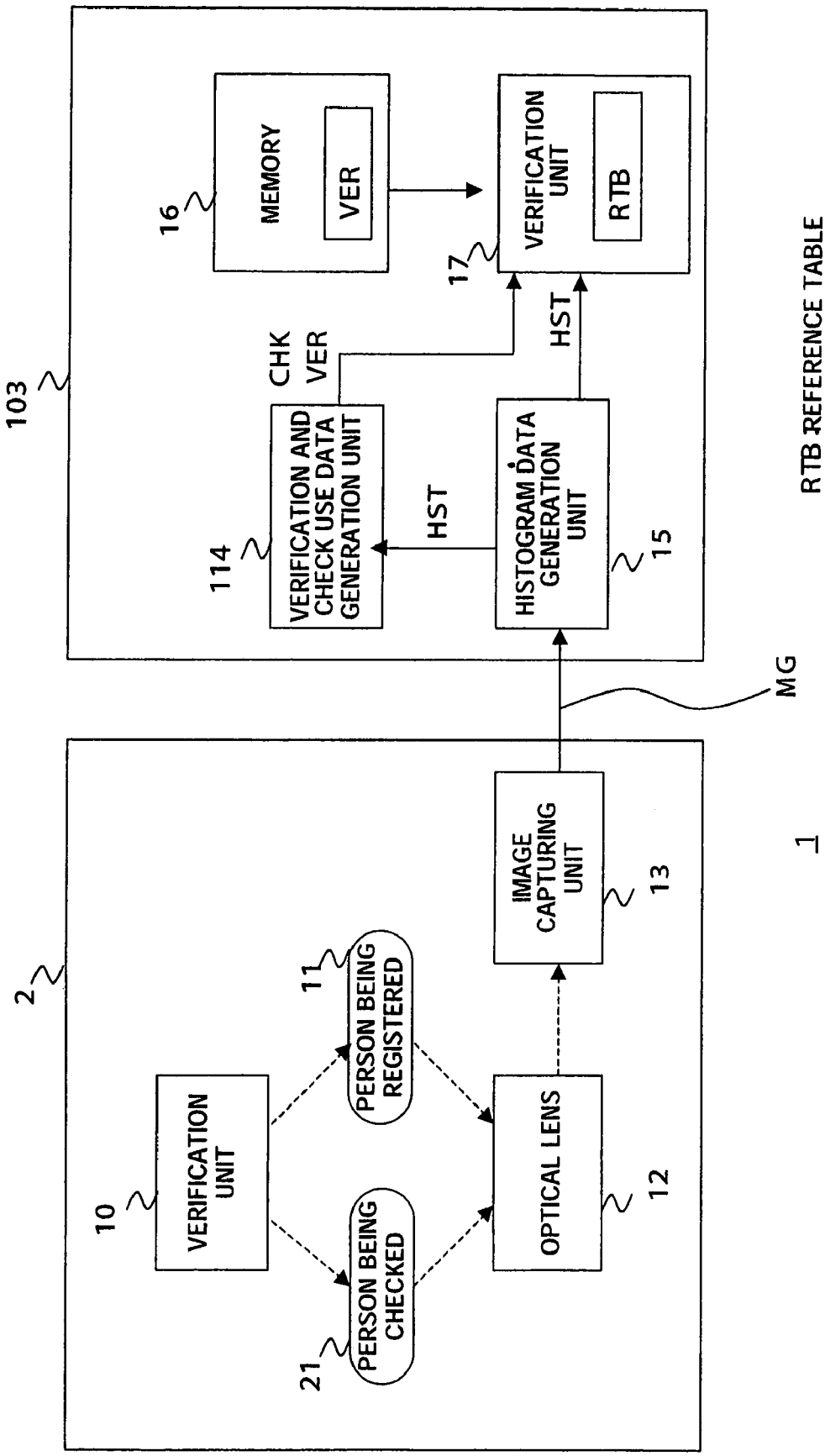
FIG. 9 is a view of the configuration of a verification system according to another embodiment of the present invention.

The histogram data generation units 15 shown in FIG. 1 and FIG. 9 correspond to the histogram data generating means of the present invention, and the memory 16 corresponds to the storing means. Further, the peak specifying means of the present invention is realized by a verification unit 17 executing the processing of step ST2 shown in FIG. 4 and step ST12 shown in FIG. 7. Further, the processing means of the present invention is realized by the verification unit 17 executing the processing of step ST5 shown in FIG. 4 or steps ST13 to ST19 shown in FIG. 7.

FIG. 1 is a view of the configuration of a verification system 1 according to an embodiment. As shown in FIG. 1, the verification system 1 has for example a image capture apparatus 2 and a verification apparatus 3.

Image Capture Apparatus 2

As shown in FIG. 1, the image capture apparatus 2 has for example an illumination unit 10, an optical lens 12, and an imaging unit 13.

The illumination unit 10 is configured by for example a halogen lamp and illuminates parts of persons being registered 11 and persons being checked 21, for example, their hands, by electromagnetic waves, for example, near infrared rays. The illumination unit 10 illuminates persons being registered 11 by for example near infrared rays at the time of registration, explained later. Further, the illumination unit 10 illuminates persons being checked 21 by for example near infrared rays at the time of verification, explained later. The persons being registered 11 and the persons being checked 21 are biological organisms. When illuminating them by electromagnetic waves, near infrared rays from red to the infrared region of the wavelength range of 600 nm to 1300 nm have a higher transmission property in comparison with electromagnetic waves of other wavelength ranges. In this wavelength range, the light absorption by the hemoglobin in the blood becomes dominant. For example, when illuminating the backs of hands of persons being registered 11 and persons being checked 21 by near infrared rays and capturing the light transmitted from the palm sides, since the electromagnetic waves are absorbed by the hemoglobin in the blood, regions corresponding to thick blood vessels in the vicinity of the surface of the palm side appear darker than in regions other than the regions corresponding to the thick blood vessels in the image captured data obtained. The veins of the blood vessels are formed in the process of growth and are acquired, so the shapes of the blood vessels vary greatly with the individual. In the present embodiment, the image data obtained by capturing images of the blood vessels is used for the verification (authentication) as identification information peculiar to each individual.

The optical lens 12 focuses the transmitted light from a person being registered 11 or a person being checked 21 to the imaging unit 13. The imaging unit 13 generates image captured data IMG based on the transmitted light focused via the optical lens 12. The imaging unit 13 is for example a charge-coupled device (CCD) type image sensor or a complementary metal-oxide semiconductor (C-MOS) type image sensor. The image captured data IMG is comprised of pixel data of pixels configuring these sensors. Each pixel data indicates a pixel value in accordance with the focusing result of the pixel corresponding to that.

Verification Apparatus 3

As shown in FIG. 1, the verification apparatus 3 has for example a verification and check use data generation unit 14, a histogram data generation unit 15, a memory 16, and a verification unit 17. The verification and check use data generation unit 14 gray scales and skeletonizes the image captured data IMG input from the image capture apparatus 2 at the time of registration to generate verification use image data VER and outputs this to the verification unit 17. Further, the verification and check use data generation unit 14 gray scales and skeletonizes the image captured data IMG input from the image capture apparatus 2 at the time of verification to generate check image data CHK and outputs this to the verification unit 17. Identically, the verification and check use data generation unit 14 applies for example a gray scale conversion of 256 tones to the image captured data IMG to generate the image data. Then, the verification and check use data generation unit 14 applies atrophication using a modulo function to the image data after the gray scale conversion to thin patterns useful for the verification, for example, patterns showing the blood vessels, and extract only the center portions of the patterns to thereby generate the verification use image data VER and the check image data CHK.

The histogram data generation unit 15 applies gray scale conversion of 256 tones to for example the image captured data IMG to generate image data comprised of a plurality of pixel data each indicating a pixel value in accordance with the gray scale conversion. Then, the histogram data generation unit 15 generates histogram data HST indicating the number of the pixel data for each pixel value based on the pixel data configuring the image data and outputs this to the verification unit 17. The histogram data generation unit 15 applies for example the above processing to each of image captured data IMG1 and IMG2 shown in FIG. 2 to generate histogram data HST1 and HST2. Note that it is also possible to provide gray scale conversion circuits for performing the gray scale conversion in front of the verification and check use data generation unit 14 and the histogram data generation unit 15 and use the outputs of the gray scale conversion circuits in the verification and check use data generation unit 14 and the histogram data generation unit 15.

The memory 16 stores for example the verification use image data VER generated by the verification and check use data generation unit 14 in a file format.

The verification unit 17 registers the verification use image data VER in the memory 16 and uses the verification use image data VER to verify the check image data CHK. The verification unit 17 holds for example the reference table data RTB shown in FIG. 3. The reference table data RTB has entries indicating the file name VER_FN of the verification use image data VER acquired by capturing the image of a person being registered, its peak value P, and the address ADR of the memory 16 where the verification use image data VER was written in correspondence for each person being registered. The peak value P indicates the peak (maximum value) of the number of the pixel data within a predetermined pixel value range RANGE of pixel values of the histogram data HST as will be explained later. These entries are sorted based on the peak values P. In the example shown in FIG. 3, the reference table data RTB has six entries corresponding to six persons being registered PSN1 to PSN6.

Next, a detailed explanation will be given of the operation of the verification unit 17 in relation to the operation of the verification apparatus 3.

Operation at Time of Registration

Figure 4:
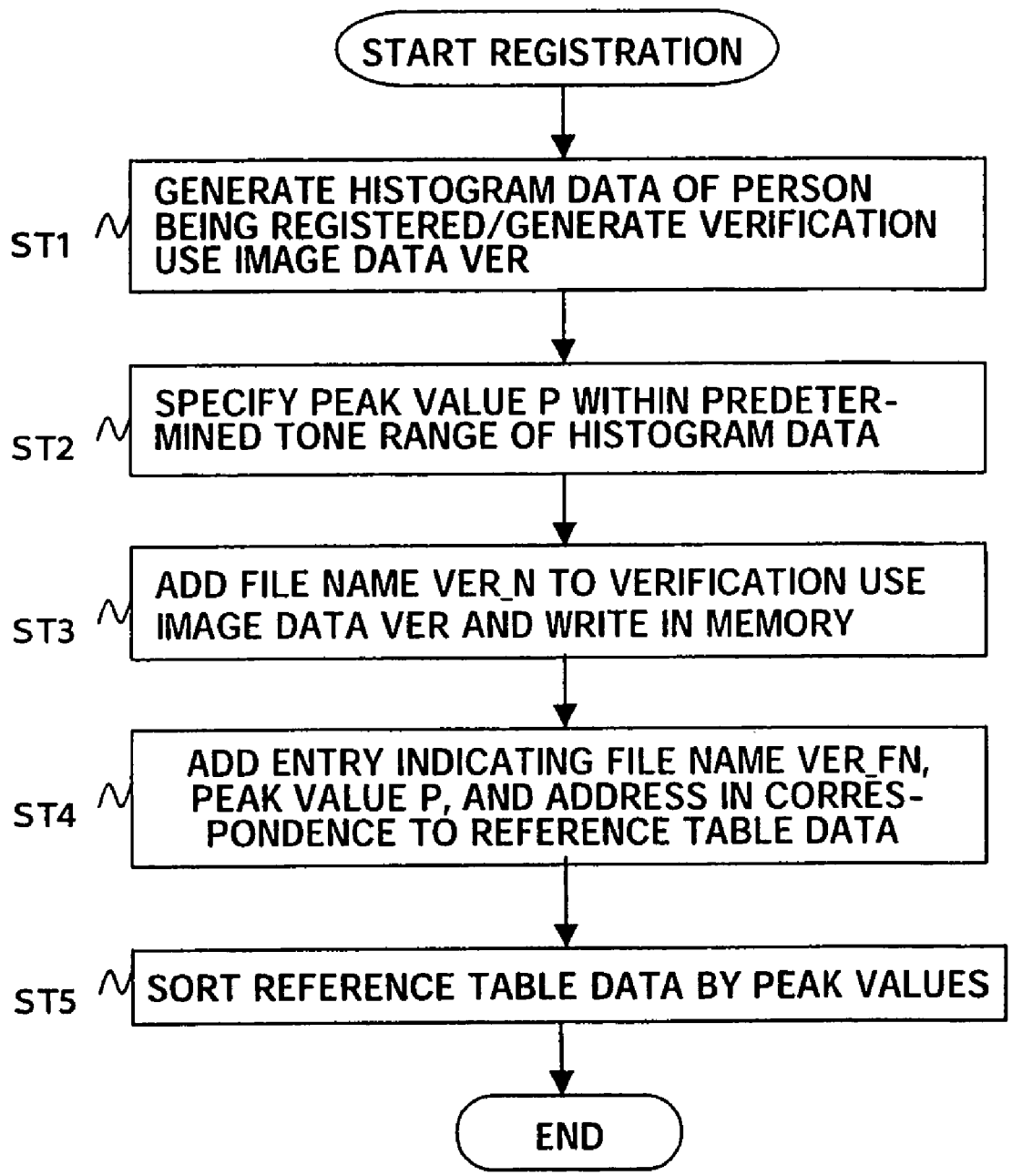
FIG. 4 is a flow chart for explaining the operation at the time of registration of the verification apparatus shown in FIG. 1.

FIG. 4 is a flow chart for explaining the operation of the verification apparatus 3 at the time of registration. The verification unit 17 performs for example the following registration for each of a plurality of persons being registered as a person being registered 11.

Step ST1

The verification and check use data generation unit 14 and the histogram data generation unit 15 of the verification apparatus 3 receive as input the image captured data IMG of a person being registered 11 obtained at the image capture apparatus 2. Then, the histogram data generation unit 15 applies gray scale conversion of 256 tones to the image captured data IMG input from the image capture apparatus 2, then generates the histogram data HST and outputs this to the verification unit 17.

Step ST2

Figure 2:
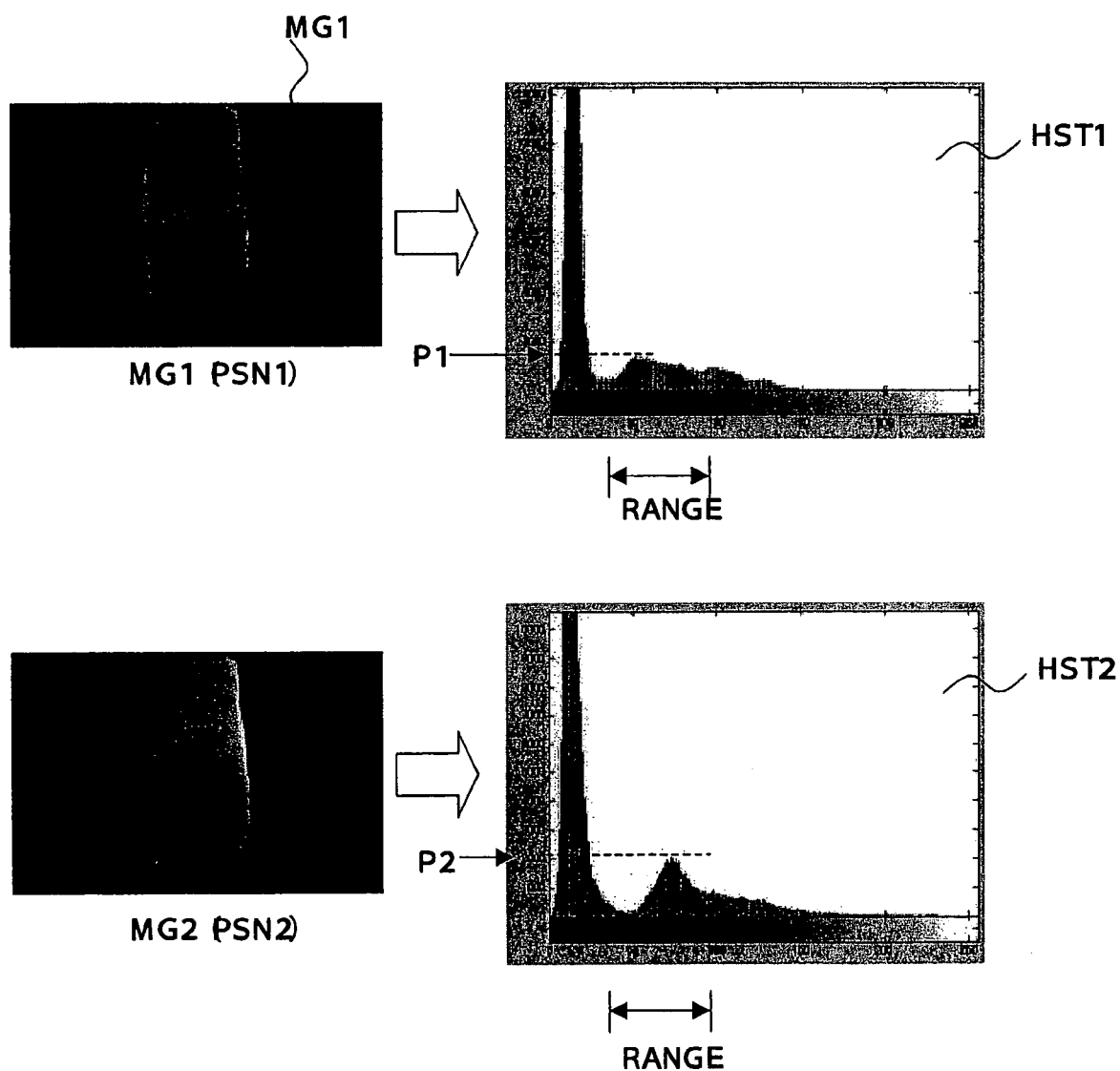
FIG. 2 is a diagram for explaining processings of a histogram data generation unit and a verification unit shown in FIG. 1.

The verification unit 17 specifies the peak value P of the number of the pixel data within the pixel value range RANGE shown in FIG. 2 of the histogram data HST input from the histogram data generation unit 15.

Step ST3

The verification unit 17 writes the verification use image data VER input from the verification and check use data generation unit 14 into the memory 16 in a file format. At this time, the verification unit 17 allocates the file name VER_FN to the file.

Step ST4

The verification unit 17 adds entries indicating the file name VER_FN allocated at step ST3, the peak value P specified at step ST2, and the address ADR of the memory 16 where the verification use image data VER was written at step ST3 in correspondence into the reference table data RTB. For example, the verification unit 17 adds entries indicating a file name VER_FN7, a peak value P7 (=1500), and an address ADR7 in correspondence as the last entry of the reference table data RTB shown in FIG. 3 to generates the reference table data RTB as shown in FIG. 5 for a person being registered PSN7 next to a person being registered PSN6 shown in FIG. 3.

Step ST5

The verification unit 17 sorts the reference table data RTB generated at step ST4 based on the peak values P to update the same as shown in FIG. 6.

Operation at Time of Verification

Figure 7:
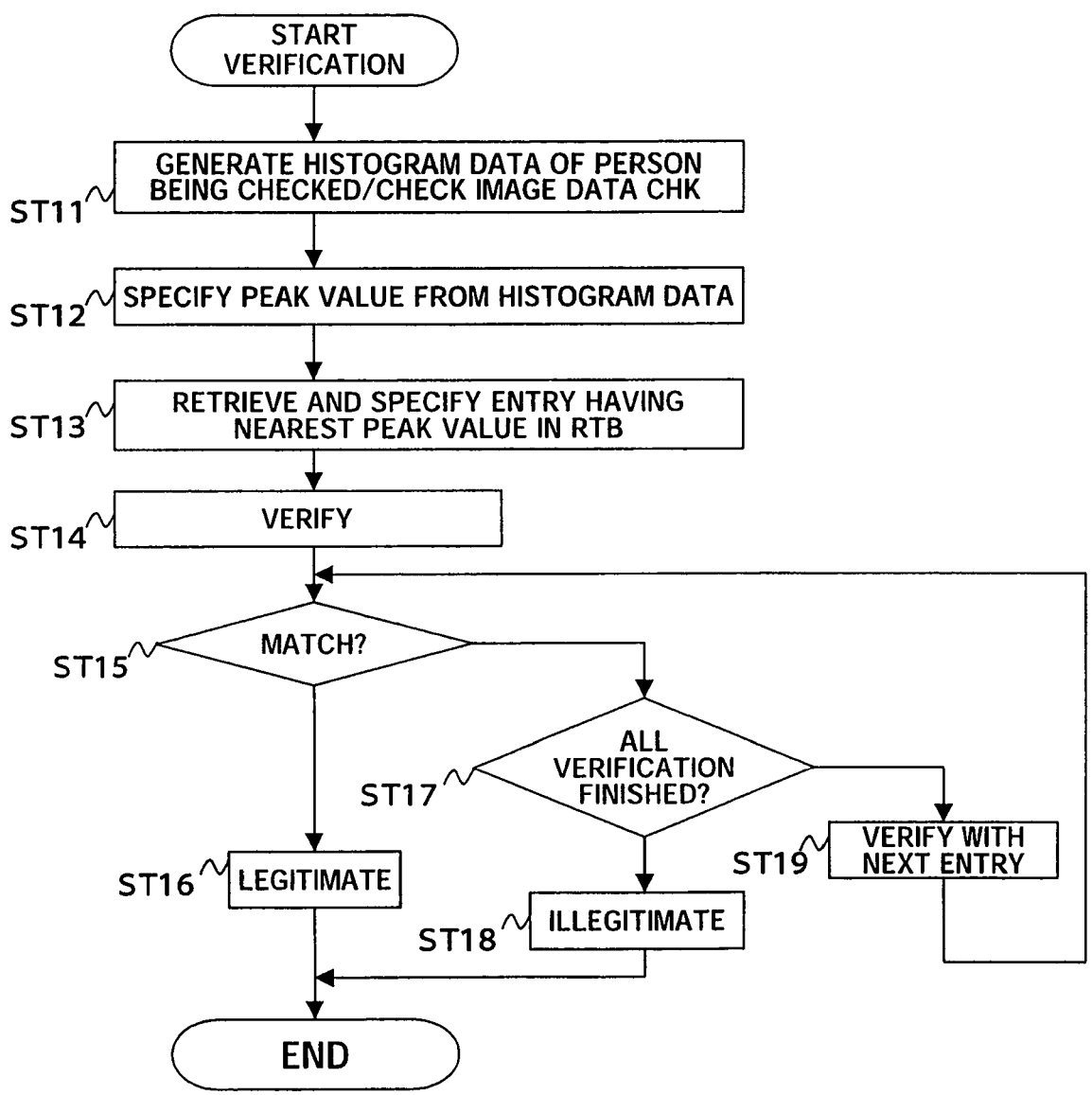
FIG. 7 is a flow chart for explaining the operation at the time of verification of the verification apparatus shown in FIG. 1.

FIG. 7 is a flow chart for explaining the operation of the verification apparatus 3 at the time of verification.

Step ST11

The verification and check use data generation unit 14 and the histogram data generation unit 15 of the verification apparatus 3 receive as input the image captured data IMG of the person being checked 21 obtained in the image capture apparatus 2. Then, the histogram data generation unit 15 applies gray scale conversion processing of 256 tones to the image captured data IMG input from the image capture apparatus 2, then generates the histogram data HST and outputs this to the verification unit 17. Further, the verification and check use data generation unit 14 gray scales and skeletonizes the image captured data IMG input from the image capture apparatus 2 to generate the check image data CHK and outputs this to the verification unit 17.

Step ST12

The verification unit 17 specifies the peak value P of the number of the pixel data within the pixel value range RANGE shown in FIG. 2 of the histogram data HST input from the histogram data generation unit 15 in step ST 11.

Step ST13

The verification unit 17 retrieves and specifies the entry having the peak value nearest the peak value P specified at step ST12 among the entries in the reference table data RTB shown in FIG. 7. For example, when the peak value P specified in step ST12 equals 1510, the verification unit 17 specifies the entry of the registered person PSN7 in the reference table data RTB as shown in FIG. 8.

Step ST14

The verification unit 17 reads out the verification use image data VER from the memory 16 based on the address ADR of the entry specified at step ST13. Then, the verification unit 17 matches and compares the check image data CHK generated at step ST11 and the read out verification use image data VER.

Step ST15

When the verification unit 17 indicates a match by the comparison of step ST14 or step ST19 explained later, the routine proceeds to step ST16. When it does not, the routine proceeds to step ST17.

Step ST16

The verification unit 17 decides that the verification use image data VER corresponding to the check image data CHK is stored in the memory 16 and the person being checked 21 is legitimate.

Step ST17

The verification unit 17 decides whether or not the verification use image data VER of all entries in the reference table data RTB shown in FIG. 7 was used for the verification. When deciding yes, the routine proceeds to step ST18, while when deciding no, the routine proceeds to step ST19.

Step ST18

The verification unit 17 decides that verification use image data VER corresponding to the check image data CHK is not stored in the memory 16 and that the person being checked 21 is illegitimate.

Step ST19

The verification unit 17 alternately selects, from among peak values sorted at the time of registration in the reference table data RTB, from the sort position closest in distance to the sort position of the entry specified at step ST13 (peak value) (hereinafter also referred to as the "first sort position") toward the furthest sort position, entries, that is, sort positions, located around the first sort position (hereinafter also referred to as the "second sort positions"), whenever the processing of step ST19 is carried out. For example, the verification unit 17 specifies the entry of the registered person PSN7 at step ST13 when the peak value P specified at step ST13 equals 1510, then sequentially selects entries of the registered person PSN3, PSN2, PSN1, PSN5, PSN4, and PSN6 whenever step ST19 is carried out. The verification unit 17 reads out the verification use image data VER from the memory 16 based on the address ADR of the selected item. Then, the verification unit 17 matches and compares the check image data CHK generated at step ST11 and the read out verification use image data VER. Note that, the verification unit 17 may also retrieve and identify the entry having the peak value nearest the peak value P specified at step ST13 among not yet matched up entries in the reference table data RTB shown in FIG. 7.

As explained above, when writing files of verification use image data VER into the memory 16 as explained by using FIG. 4, the verification apparatus 3 prepares the reference table data RTB sorted based on the peak values P as explained by using FIG. 6. Further, the verification apparatus 3, as explained by using FIG. 7, specifies the peak value nearest the peak value P specified corresponding to the check image data CHK from the reference table data RTB and uses the verification use image data VER corresponding to the specified peak value for the initial verification. Further, it then uses the verification use image data VER corresponding to the peak values located at sort positions around the specified peak value for the verification. For this reason, according to the verification apparatus 3, verification use image data VER corresponding to a peak value near the check image data CHK can be used for verification on a priority basis. When the person being checked 21 is the legitimate person, a match can be obtained at the relatively early stage of step ST15. Namely, according to the verification apparatus 3, the verification time can be shortened in comparison with the case where the verification use image data VER is used in the order of registration as in the case of the related art.

As shown in FIG. 1, the case where the verification and check use data generation unit 14 generated the verification use image data VER and the check image data CHK based on the image captured data IMG from the imaging unit 13 was exemplified. In a verification system 103 of another embodiment, as shown in FIG. 9, a verification and check use data generation unit 114 generates the verification use image data VER and the check image data CHK based on the histogram data HST from the histogram data generation unit 15. The rest of the configuration other than the verification and check use data generation unit 114 is the same as that as described above.

The verification and check use data generation unit 114 specifies for example pixel values indicating a number of the pixel data determined in advance within the first pixel value range in the histogram data HST and specifies a second pixel value range not more than the maximum pixel value among the specified pixel values. Next, the verification and check use data generation unit 114 maps the histogram data HST within the specified second pixel value range in the first pixel value range to generate new histogram data HSTa. Next, the verification and check use data generation unit 114 applies predetermined filtering to the histogram data HSTa to generate the image data. Next, the verification and check use data generation unit 114 skeletonizes the image data to generate the verification use image data VER and the check image data CHK. According to the second embodiment as well, the same effect as that of the first embodiment is obtained.

The present invention is not limited to the above described embodiments. As previously discussed, the finger of a person being checked was illustrated as the registered object and checked object, but the objects may be parts of the body other than the finger too. Further, the registered object and checked object of the present invention need not be living tissue.

As explained above, an image processing apparatus able to shorten the verification time when using a plurality of verification use image data stored in a storing means for a verification and a method of the same can be provided. As to the specific application in industry, the present invention can be applied to for example an image processing apparatus for processing image data obtained by capturing the image of a checked object.

It should be appreciated that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An image processing apparatus comprising:
   a histogram data generating means for generating histogram data indicating a number of pixel data indicating a particular pixel value for each pixel value based on image captured data that includes a plurality of pixel data obtained by capturing an image of an object to be registered and each indicating a pixel value;
   a peak specifying means for specifying a peak value of the number of said pixel data indicating a particular pixel value for pixel values in a predetermined range in said histogram data generated by said histogram data generating means;
   a storing means for storing the verification use image data obtained based on said image captured data; and
   a processing means for writing said verification use image data into said storing means linked with the peak value specified by said peak specifying means corresponding to that verification use image data and sorting said peak values linked with said verification use image data stored in said storing means.

2. An image processing apparatus as set forth in claim 1, wherein
   said histogram data generating means generates said histogram data based on said image captured data obtained by capturing an image of a checked object, wherein
   said peak specifying means specifies the peak value of the number of said image data indicating pixel values in a predetermined range of pixel values in said histogram data of said checked object, and wherein
   said processing means selects the peak value closest to the peak value specified for said checked object among said sorted peak values and uses said verification use image data stored in said storing means corresponding to said selected peak value and said check use image data for initial verification.

3. An image processing apparatus as set forth in claim 2, wherein said processing means alternately selects, from among said sorted peak values, from a sort position closest in distance to a first sort position of said specified peak value for said checked object toward the furthest sort position, second sort positions located around said first sort position and successively performs said verification between said verification use image data stored in said storing means corresponding to said peak value sorted at said selected second sort position and said check use image data.

4. An image processing apparatus as set forth in claim 1, wherein said processing means generates reference data showing said peak values and addresses of storage of said verification use image data corresponding to said peak values in correspondence and sorts said peak values in said reference data.

5. An image processing apparatus as set forth in claim 1, further comprising a verification use data generating means for skeletonizing said image captured data to generate said verification use image data.

6. An image processing apparatus as set forth in claim 1, further comprising a verification use data generating means for generating said verification use image data based on said histogram data generated by said histogram data generating means.

7. An image processing method comprising:
generating histogram data indicating a number of pixel data indicating a particular pixel value for each pixel value based on image captured data that includes a plurality of pixel data obtained by capturing an image of an object to be registered and each indicating a pixel value;
specifying a peak value of the number of said pixel data indicating a particular pixel value for pixel values in a predetermined range in said histogram data;
generating verification use image data based on said image captured data; and
writing said verification use image data into the storing means linked with the peak value corresponding to the verification use image data and sorting said peak values linked with said verification use image data stored in said storing means.

8. An image processing method as set forth in claim 7, further comprising:
generating said histogram data based on said image captured data obtained by capturing an image of a checked object,
specifying the peak value of the number of said image data indicating pixel values in a predetermined range of pixel values in said histogram data of said checked object, and
selecting the peak value closest to the peak value specified for said checked object among said sorted peak values and using said verification use image data stored in said storing means corresponding to said selected peak value and said check use image data for initial verification.

* * * * *